United States Patent
Koyama et al.

(10) Patent No.: US 12,233,842 B2
(45) Date of Patent: Feb. 25, 2025

(54) VEHICLE BEHAVIOR CONTROL METHOD

(71) Applicant: Honda Motor Co., Ltd., Tokyo (JP)

(72) Inventors: Ryo Koyama, Tokyo (JP); Masayuki Kikuchi, Tokyo (JP); Shigeru Doi, Tokyo (JP); Naoto Okubo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/403,719

(22) Filed: Jan. 4, 2024

(65) Prior Publication Data
US 2024/0286599 A1    Aug. 29, 2024

(30) Foreign Application Priority Data
Feb. 23, 2023    (CN) .......................... 202310155507.3

(51) Int. Cl.
*B60W 30/045*    (2012.01)
*B60W 10/16*    (2012.01)
(Continued)

(52) U.S. Cl.
CPC .......... *B60W 10/16* (2013.01); *B60W 30/045* (2013.01); *B60W 10/20* (2013.01); *B60W 30/09* (2013.01); *B60W 2510/20* (2013.01); *B60W 2510/202* (2013.01); *B60W 2510/205* (2013.01); *B60W 2510/207* (2013.01); *B60W 2520/105* (2013.01); *B60W 2520/125* (2013.01); *B60W 2520/28* (2013.01); *B60W 2540/165* (2013.01); *B60W 2540/18* (2013.01); *B60W 2552/15* (2020.02); *B60W 2710/20* (2013.01); *B60W 2710/202* (2013.01); *B60W 2710/205* (2013.01);
(Continued)

(58) Field of Classification Search
CPC .............. B60W 10/16; B60W 30/045; B60W 2520/105; B60W 2520/125; B60W 2520/28; B60W 2540/18; B60W 2552/15; B60W 2720/406
See application file for complete search history.

(56) References Cited

U.S. PATENT DOCUMENTS

| | | | |
|---|---|---|---|
| 6,035,251 A * | 3/2000 | Hac ........................ | B60T 8/1755 303/146 |
| 10,981,562 B2 * | 4/2021 | Watanabe ........... | B60W 30/045 |
| 2018/0134267 A1 * | 5/2018 | Mitsumoto ............... | B60T 8/58 |

FOREIGN PATENT DOCUMENTS

| | | | | |
|---|---|---|---|---|
| CN | 1439556 A | * | 9/2003 | |
| DE | 102018201189 A1 | * | 7/2019 | .......... B60W 30/045 |

(Continued)

*Primary Examiner* — Tinh Dang
(74) *Attorney, Agent, or Firm* — JCIPRNET

(57) ABSTRACT

A vehicle behavior control method is suitable for a vehicle behavior control device. The vehicle behavior control device includes: a lateral acceleration sensor, detecting lateral acceleration occurring in a vehicle body; a wheel speed sensor, detecting a wheel speed of a wheel; a steering angle sensor, detecting a steering angle of the wheel; a steering angle lateral acceleration calculation unit, calculating steering angle lateral acceleration from the wheel speed and the steering angle; and a yaw moment control unit, applying yaw moment to the vehicle body. In the vehicle behavior control method, when the lateral acceleration and the steering angle lateral acceleration meet a predetermined condition, a yaw moment directed inward in a turning direction of the vehicle body is applied by the yaw moment control unit.

10 Claims, 11 Drawing Sheets

(51) Int. Cl.
*B60W 10/20* (2006.01)
*B60W 30/02* (2012.01)
*B60W 30/09* (2012.01)

(52) U.S. Cl.
CPC . *B60W 2710/207* (2013.01); *B60W 2720/406* (2013.01)

(56) References Cited

FOREIGN PATENT DOCUMENTS

| | | | | |
|---|---|---|---|---|
| JP | H09123937 | | 5/1997 | |
| JP | 2015023753 A | * | 2/2015 | .......... B60W 30/045 |
| JP | 2019206312 A | * | 12/2019 | .......... B60W 30/045 |

* cited by examiner

VEHICLE BEHAVIOR CONTROL METHOD

CROSS-REFERENCE TO RELATED APPLICATIONS

This application claims the priority benefit of China Application No. 202310155507.3, filed on Feb. 23, 2023. The entirety of the above-mentioned patent application is hereby incorporated by reference herein and made a part of this specification.

BACKGROUND

Technical Field

The disclosure relates to a control method, in particular to a vehicle behavior control method.

Related Art

An existing technology is to actively distribute torque to a left rear wheel (WRL) and a right rear wheel (WRR) of a vehicle to generate yaw moment, thereby increasing critical lateral acceleration and improving cornering performance of the vehicle.

In Japanese Patent Laid-Open No. H9-123937, according to the magnitude of lateral acceleration, driving force is generated on an outer wheel of a turning wheel and braking force is generated on an inner wheel of the turning wheel. While total cornering force of the front and rear wheels is ensured, the cornering force borne by the front wheel is reduced and the cornering force borne by the rear wheel is increased. In this way, a certain margin is allowed in the cornering force of the front wheel near a critical point due to a relatively large ground load, and this margin can be used to increase the critical lateral acceleration.

The existing technology is to increase the yaw moment by distributing the torque to the rear wheel. However, during an uphill turn, for example, the torque needs to be distributed to the front wheel. Hence, there is room for improvement.

A subject is how to improve cornering performance of a vehicle during high lateral acceleration cornering by increasing the critical lateral acceleration of the vehicle.

SUMMARY

A vehicle behavior control method is suitable for a vehicle behavior control device. The vehicle behavior control device includes: a lateral acceleration sensor, detecting lateral acceleration occurring in a vehicle body; a wheel speed sensor, detecting a wheel speed of a wheel; a steering angle sensor, detecting a steering angle of the wheel; a steering angle lateral acceleration calculation unit, calculating steering angle lateral acceleration from the wheel speed and the steering angle; and a yaw moment control unit, applying yaw moment to the vehicle body. In the vehicle behavior control method, when the lateral acceleration and the steering angle lateral acceleration meet a predetermined condition, a yaw moment directed inward in a turning direction of the vehicle body is applied by the yaw moment control unit.

DESCRIPTION OF THE EMBODIMENTS

Figure 1:
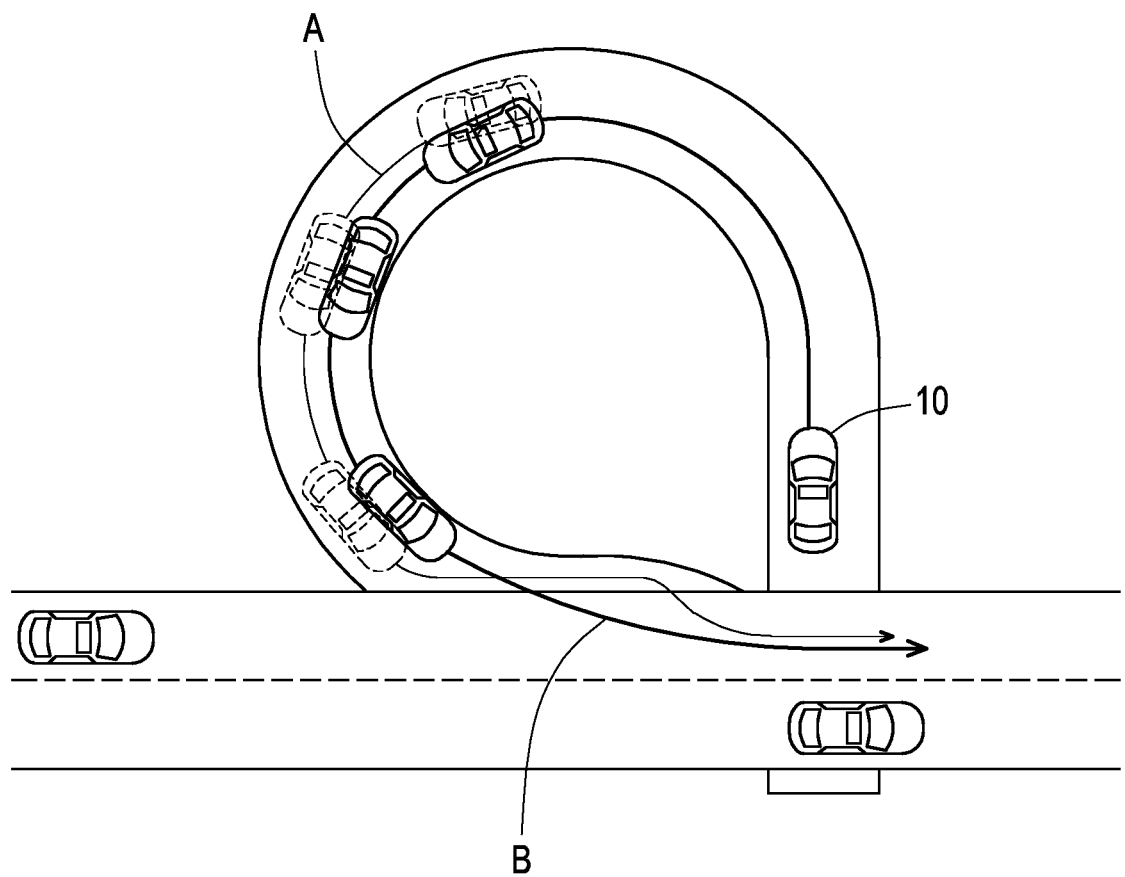
FIG. 1 illustrates a schematic diagram of a vehicle cornering behavior according to one embodiment of the disclosure.

According to the disclosure, operability of a vehicle may be improved. Furthermore, traffic safety may be improved, thereby contributing to the development of a sustainable conveying system.

The disclosure provides a vehicle behavior control method suitable for a vehicle behavior control device. The vehicle behavior control device includes: a lateral acceleration sensor, detecting lateral acceleration occurring in a vehicle body; a wheel speed sensor, detecting a wheel speed of a wheel; a steering angle sensor, detecting a steering angle of the wheel; a steering angle lateral acceleration calculation unit, calculating steering angle lateral acceleration from the wheel speed and the steering angle; and a yaw moment control unit, applying yaw moment to the vehicle body. In the vehicle behavior control method, when the lateral acceleration and the steering angle lateral acceleration meet a predetermined condition, a yaw moment directed inward in a turning direction of the vehicle body is applied by the yaw moment control unit.

According to the vehicle behavior control method, a situation where application of the yaw moment is necessary is determined based on the lateral acceleration and the steering angle lateral acceleration. By applying the yaw moment to the wheel, all the wheels can be effectively used, the critical lateral acceleration can be instantly increased, and the cornering performance can be improved.

In one embodiment of the disclosure, when the lateral acceleration is greater than or equal to a first threshold, a procedure for applying the yaw moment is executed.

In one embodiment of the disclosure, when the lateral acceleration is less than the first threshold, no procedure for applying the yaw moment is executed.

In one embodiment of the disclosure, when the steering angle lateral acceleration is greater than or equal to a second threshold, the procedure for applying the yaw moment is executed.

In one embodiment of the disclosure, when the steering angle lateral acceleration is less than the second threshold, no procedure for applying the yaw moment is executed.

According to the vehicle behavior control method, a road having a low friction coefficient can be determined using the lateral acceleration and the steering angle lateral acceleration without detecting a friction coefficient between a tire and the ground. Thus, control can be simplified and cost can be reduced.

In one embodiment of the disclosure, the vehicle behavior control device further includes a steering angular velocity detection unit configured to detect a steering angular velocity. In the vehicle behavior control method, when the steering angular velocity is greater than or equal to a third threshold, no procedure for applying the yaw moment is executed.

According to the vehicle behavior control method, if the steering angular velocity is greater than or equal to a threshold, it is determined that intervention by vehicle behavior control is not desired, and thus no vehicle behavior control is executed. Accordingly, no discomfort is experienced by a driver.

In one embodiment of the disclosure, the vehicle behavior control device further includes a tilt sensor configured to detect a road gradient. In the vehicle behavior control method, when the tilt sensor detects an upward gradient, the applied yaw moment is increased by the yaw moment control unit. In one embodiment of the disclosure, the yaw moment control unit increases the applied yaw moment as the upward gradient increases.

According to the vehicle behavior control method, when the tilt sensor detects a value (upward gradient) above a threshold, load (vehicle weight) may be applied to a rear wheel, and effective use of a front wheel may be prevented. Accordingly, by increasing the applied yaw moment, the cornering performance can be improved.

In one embodiment of the disclosure, when the tilt sensor detects a downward gradient, the applied yaw moment is reduced by the yaw moment control unit. In one embodiment of the disclosure, the yaw moment control unit reduces the applied yaw moment as the downward gradient increases.

According to the vehicle behavior control method, when the tilt sensor detects a value (downward gradient) below the threshold, load may be applied to the front wheel, and the ground load of a tire may be increased. Accordingly, by reducing the applied yaw moment, excessive cornering can be prevented and cornering can be facilitated.

In one embodiment of the disclosure, the vehicle behavior control device further includes a vehicle speed sensor configured to detect a vehicle speed and an acceleration state determination unit configured to determine an acceleration state of the vehicle based on the vehicle speed. In the vehicle behavior control method, when the acceleration state determination unit determines that the vehicle is accelerating, the applied yaw moment is increased by the yaw moment control unit.

According to the above method, during acceleration of the vehicle, a force opposite to a traveling direction of the vehicle acts on the vehicle body. The load acts on a rear wheel, and the load on a front wheel is relatively reduced. Accordingly, the acceleration state of the vehicle body can be determined based on vehicle speed information. By increasing the applied yaw moment only during acceleration, a change in cornering properties caused by load shift can be reduced, and the cornering performance can be improved.

Based on the above, in the vehicle behavior control method of the disclosure, by utilizing the yaw moment generated by a difference in front and rear force such as braking force and driving force between a left wheel and a right wheel, the cornering performance of the vehicle can be improved. By adding the yaw moment based on cornering lateral acceleration to the vehicle on a side that is pushing the cornering, limits of the cornering performance of the vehicle can be improved.

Reference will now be made in detail to the exemplary embodiments of the disclosure, examples of which are illustrated in the accompanying drawings. Wherever possible, the same reference numerals are used in the drawings and the description to refer to the same or like portions.

According to an embodiment of the disclosure, when a vehicle suddenly undergoes high lateral acceleration cornering on a high speed slope, critical lateral acceleration of the vehicle can be increased. FIG. 1 illustrates a schematic diagram of a vehicle cornering behavior according to one embodiment of the disclosure. Referring to FIG. 1, when a vehicle 10 undergoes high lateral acceleration cornering, if no control is carried out, the vehicle is likely to deviate to the outside of the road, as indicated by route A. In this regard, in the present embodiment, vehicle behavior is determined from lateral acceleration and angular velocity. By applying yaw moment to a wheel, all the wheels can be effectively used and the critical lateral acceleration can be instantly increased, thereby improving cornering performance of the vehicle 10. Accordingly, as indicated by route B, even during high lateral acceleration cornering, the vehicle 10 does not deviate to the outside of the road, and safe traveling is possible.

Figure 2A:
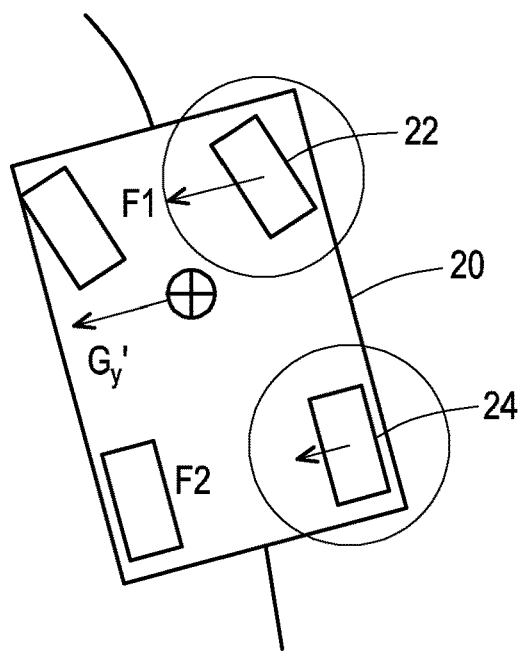
FIG. 2A and FIG. 2B illustrate schematic diagrams of a control logic of vehicle behavior according to one embodiment of the disclosure.
Figure 2B:
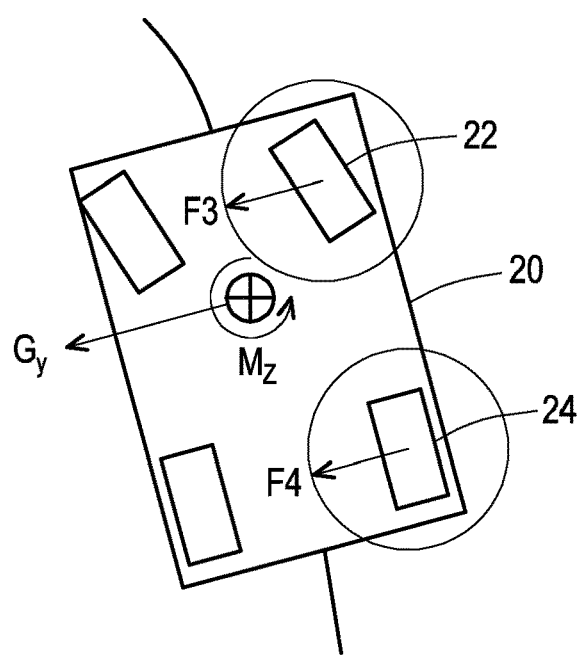

FIG. 2A and FIG. 2B illustrate schematic diagrams of a control logic of vehicle behavior according to one embodiment of the disclosure. In the present embodiment, since a tire contacts a road surface and the required yaw moment is provided according to the load, the critical lateral acceleration can be increased. FIG. 2A and FIG. 2B illustrate a vehicle 20 in states where vehicle behavior control of the present embodiment is turned on and turned off, respectively. Referring first to FIG. 2A, when the vehicle 20 makes a left turn, a right front wheel 22 thereof rubs against the road surface and a cornering force F1 is generated, and a right rear wheel 24 thereof rubs against the road surface and a cornering force F2 is generated. At this time, while the right rear wheel 24 has power left, the right front wheel 22 has no power left due to overload. As a result, lateral acceleration $G_y'$ cannot be increased. Referring to FIG. 2B, after the vehicle behavior control is turned on, by applying yaw moment $M_z$ directed inward in a turning direction of the vehicle 20, the cornering force of the right rear wheel 24 can be effectively increased to F4 and the cornering force of the right front wheel 22 can be reduced to F3, thereby reducing the load. That is, by effectively using the front and rear wheels, lateral acceleration $G_y$ can be increased in the vehicle 20. The yaw moment $M_z$ applied in the present embodiment is expressed as follows:

$$M_z = \alpha G_y$$

In this expression, $\alpha$ is control gain, and $G_y$ is lateral acceleration.

When yaw moment is applied to a bending side of a turn on a road having a low friction coefficient, the vehicle behavior becomes unstable. Accordingly, the vehicle behavior control described above may only be implemented, for example, on a dry road. A method for distinguishing lateral acceleration G for control between a dry road and a road having a low friction coefficient mainly uses sensor lateral acceleration $sensG_y$. However, in the case of using only the sensor lateral acceleration sensG$_y$, a delay may occur in control amount when switching back. Accordingly, during cornering, for example, the lower of sensor lateral acceleration sensG$_y$ and steering angle lateral acceleration strG$_y$ may be selected as the lateral acceleration G for control to perform the vehicle behavior control.

$$G_y = \min(sensG_y, strG_y)$$

Figure 3:
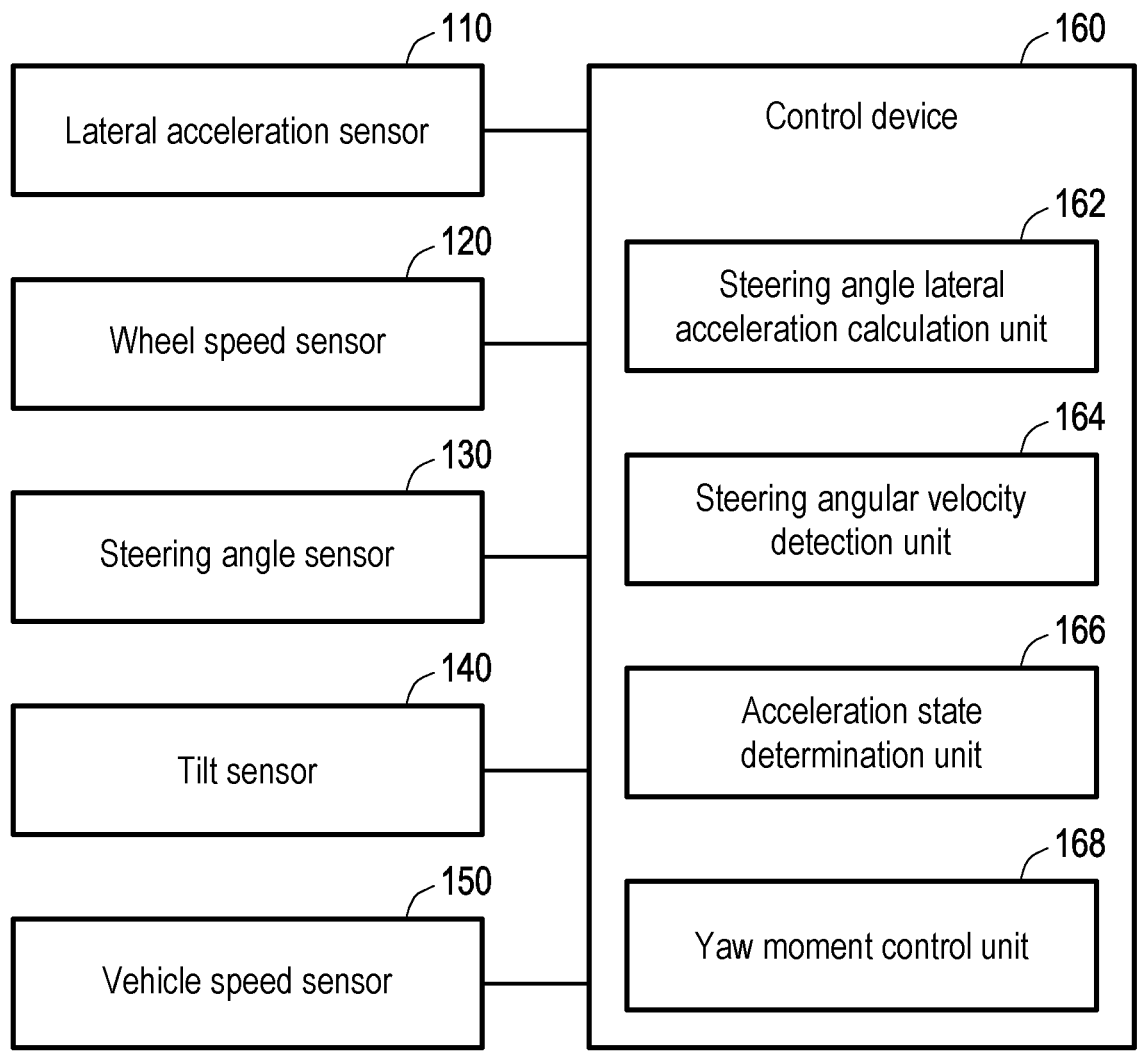
FIG. 3 illustrates a schematic block diagram of a vehicle behavior control device according to one embodiment of the disclosure.

FIG. 3 illustrates a schematic block diagram of a vehicle behavior control device according to one embodiment of the disclosure. Referring to FIG. 3, a vehicle behavior control device 100 is, for example, disposed in a vehicle to control traveling of the vehicle. In the present embodiment, examples of the vehicle include a car powered by an internal combustion engine such as a diesel engine or a gasoline engine, an electric car powered by an electric motor, and a hybrid car having both an internal combustion engine and an electric motor.

As illustrated in FIG. 3, the vehicle behavior control device 100 includes a lateral acceleration sensor 110, a wheel speed sensor 120, a steering angle sensor 130, a tilt sensor 140, a vehicle speed sensor 150, and a control device 160.

The lateral acceleration sensor 110 is configured to detect lateral acceleration (that is, acceleration occurring in a lateral direction (width direction) of the vehicle) of the vehicle, and output the detected lateral acceleration (m/s$^2$) to the control device 160. The lateral acceleration sensor 110 is provided in, for example, the center of gravity of the vehicle (vehicle body). Alternatively, the lateral acceleration sensor 110 may be provided in a portion supporting each wheel. The present embodiment does not limit how the lateral acceleration sensor is provided.

The wheel speed sensor 120 is configured to detect a rotation state (rotation speed) of a rotor of the wheel speed sensor installed on a wheel, so as to detect a wheel speed of the vehicle and output the wheel speed to the control device 160.

The steering angle sensor 130 is configured to detect a steering angle (in radians (rad)) of the vehicle and output the steering angle to the control device 160.

The tilt sensor 140 includes an acceleration sensor and a rate sensor (angular velocity sensor) such as a gyro sensor, and outputs a detection signal of these sensors to the control device 160. The control device 160 may perform predetermined measurement operation processing based on the output of the acceleration sensor and the rate sensor of the tilt sensor 140, and acquire a "tilt direction and tilt angle relative to a vertical direction" of a portion (vehicle body) where the tilt sensor 140 is located.

The vehicle speed sensor 150 is configured to detect a vehicle speed (in meters per second (m/s)) of the vehicle, and output the vehicle speed to the control device 160.

The control device 160 includes a steering angle lateral acceleration calculation unit 162, a steering angular velocity detection unit 164, an acceleration state determination unit 166, and a yaw moment control unit 168. Some or all of the above devices may be implemented by a processor executing a program. Furthermore, some or all of the above devices may be implemented by hardware such as large scale integration (LSI) or an application specific integrated circuit (ASIC), or may be implemented by a combination of software and hardware, and the present embodiment does not limit its implementation.

The steering angle lateral acceleration calculation unit 162 calculates steering angle lateral acceleration by multiplying the steering angle input from the steering angle sensor 130 by a lateral acceleration gain corresponding to a current vehicle speed acquired by the vehicle speed sensor 150. That is, steering angle lateral acceleration=steering angle×lateral acceleration gain. The lateral acceleration gain is obtained by querying a previously acquired correspondence table between vehicle speed and lateral acceleration gain.

The steering angular velocity detection unit 164, for example, differentiates a steering angle signal from the steering angle sensor 130 and calculates a steering angular velocity.

The acceleration state determination unit 166, for example, based on the vehicle speed of the vehicle input from the vehicle speed sensor 150, calculates acceleration of the vehicle by differentiating the vehicle speed, and determines an acceleration state of the vehicle based on the calculated acceleration.

The yaw moment control unit 168 is configured to adjust a driving force applied to four wheels of the vehicle during cornering of the vehicle, so as to apply, to the vehicle body of the vehicle, a yaw moment directed inward in a turning direction of the vehicle body. In some embodiments, the yaw moment control unit 168 may apply, to the vehicle body, the yaw moment directed inward in the turning direction of the vehicle, for example, when the lateral acceleration and the steering angle lateral acceleration of the vehicle meet a predetermined condition.

Figure 4:
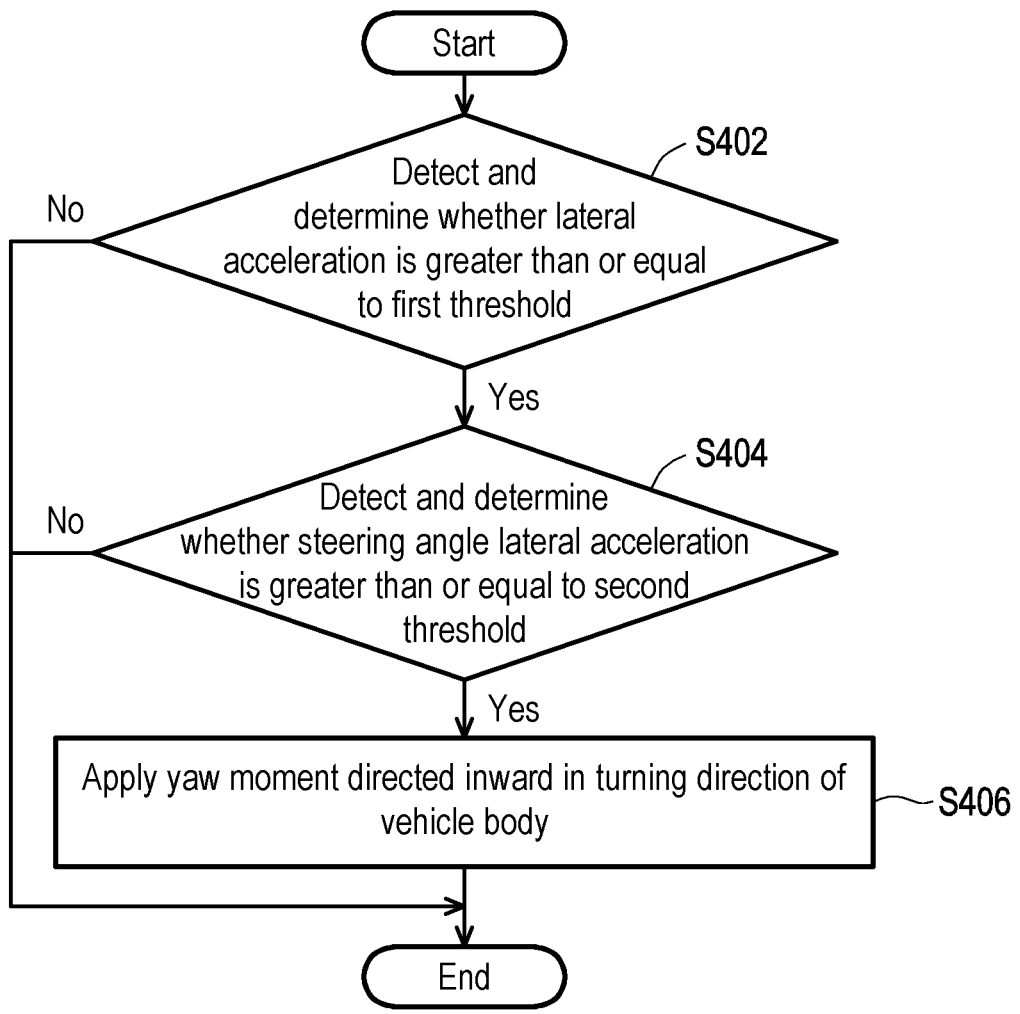
FIG. 4 is a flowchart of a vehicle behavior control method according to one embodiment of the disclosure.

In detail, FIG. 4 is a flowchart of a vehicle behavior control method according to one embodiment of the disclosure. Referring to FIG. 3 and FIG. 4, the vehicle behavior control method of the present embodiment is suitable for the vehicle behavior control device 100 of FIG. 3. The following describes detailed steps of the vehicle behavior control method of the present embodiment with reference to each unit in the vehicle behavior control device 100.

In step S402, in the vehicle behavior control device 100, the lateral acceleration sensor 110 detects the lateral acceleration occurring in the vehicle body, and the control device 160 determines whether the lateral acceleration is greater than or equal to a first threshold. If the control device 160 determines that the lateral acceleration is greater than or equal to the first threshold, the process proceeds to step S404 to perform determination of the next step. If the control device 160 determines that the lateral acceleration is less than the first threshold, the process ends.

In step S404, in the vehicle behavior control device 100, the wheel speed sensor 120 detects the wheel speed of the wheel, and the steering angle sensor 130 detects the steering angle of the wheel. Accordingly, the steering angle lateral acceleration calculation unit 162 of the control device 160 calculates the steering angle lateral acceleration according to the wheel speed and the steering angle, and the control device 160 determines whether the steering angle lateral acceleration is greater than or equal to a second threshold.

If the control device 160 determines that the steering angle lateral acceleration is greater than or equal to the second threshold, the process proceeds to step S406 in which the yaw moment control unit 168 applies the yaw moment directed inward in the turning direction of the vehicle body. If the control device 160 determines that the steering angle lateral acceleration is less than the second threshold, the process ends.

Figure 5A:
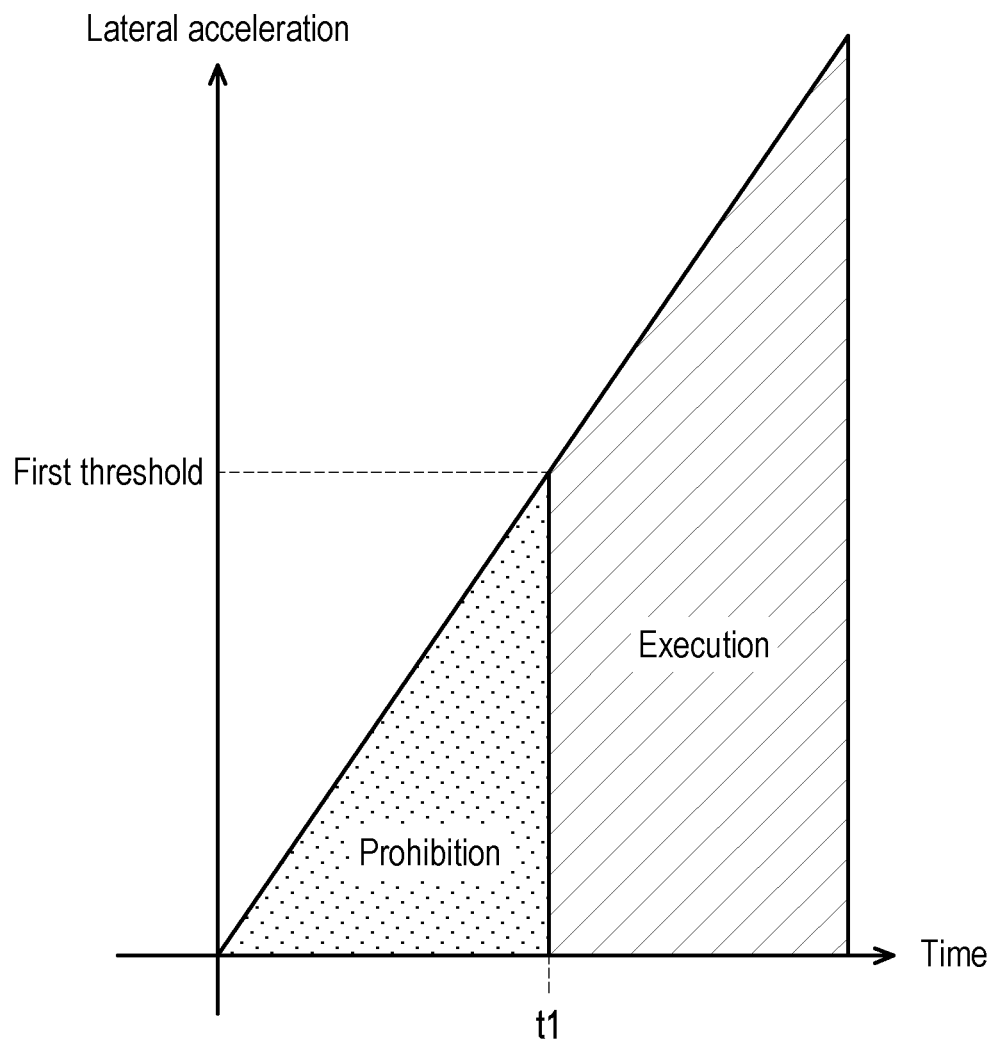
FIG. 5A and FIG. 5B are examples of executing a procedure for applying yaw moment according to one embodiment of the disclosure.
Figure 5B:
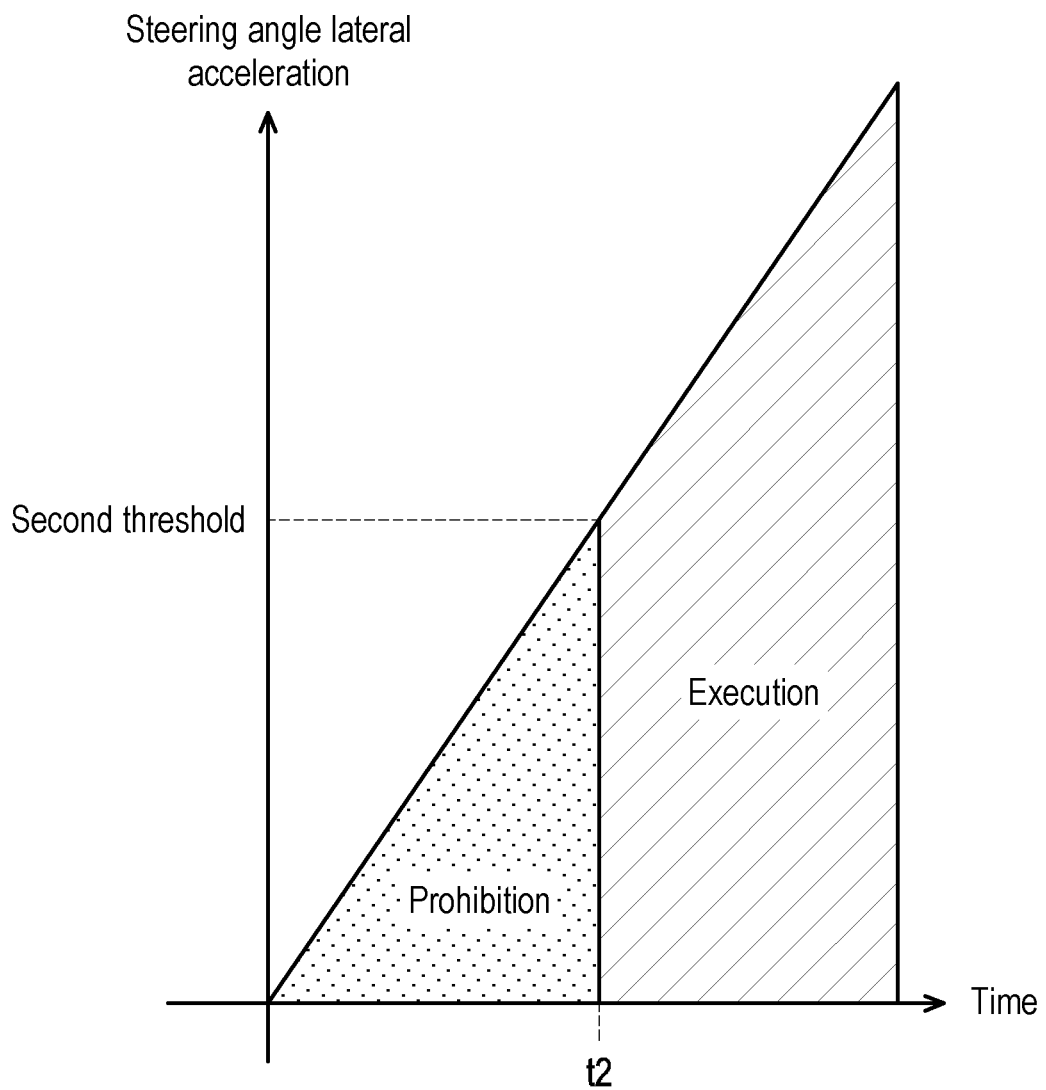

FIG. 5A and FIG. 5B are examples of executing a procedure for applying the yaw moment according to one embodiment of the disclosure. In the present embodiment, one or more thresholds are set for each of the lateral acceleration and the steering angle lateral acceleration of the vehicle. As illustrated in FIG. 5A, if the detected lateral acceleration of the vehicle is less than the first threshold, execution of the procedure for applying the yaw moment is prohibited; if the detected lateral acceleration of the vehicle is greater than or equal to the first threshold, the procedure for applying the yaw moment can be executed starting from a time point t1 when the lateral acceleration exceeds the first threshold. As illustrated in FIG. 5B, if the detected steering angle lateral acceleration of the vehicle is less than the second threshold, execution of the procedure for applying the yaw moment is prohibited; if the detected steering angle lateral acceleration of the vehicle is greater than or equal to the second threshold, the procedure for applying the yaw moment can be executed starting from a time point t2 when the steering angle lateral acceleration exceeds the second threshold. In some embodiments, the procedure for applying the yaw moment can be executed only when the detected lateral acceleration of the vehicle is greater than or equal to the first threshold and the detected steering angle lateral acceleration is greater than or equal to the second threshold. However, the present embodiment is not limited thereto.

On a road having a low friction coefficient, since increasing the yaw moment may cause unstable vehicle behavior, control of vehicle behavior is undesirable. Accordingly, in the present embodiment, a road having a low friction coefficient can be determined using the lateral acceleration and the steering angle lateral acceleration without detecting a friction coefficient between a tire and the ground. Thus, control can be simplified and cost can be reduced.

To sum up, the vehicle behavior control device of the present embodiment determines a situation where application of the yaw moment is necessary based on the lateral acceleration and the steering angle lateral acceleration. By applying the yaw moment to the wheel, all the wheels can be effectively used, the critical lateral acceleration can be instantly increased, and the cornering performance can be improved.

Figure 6:
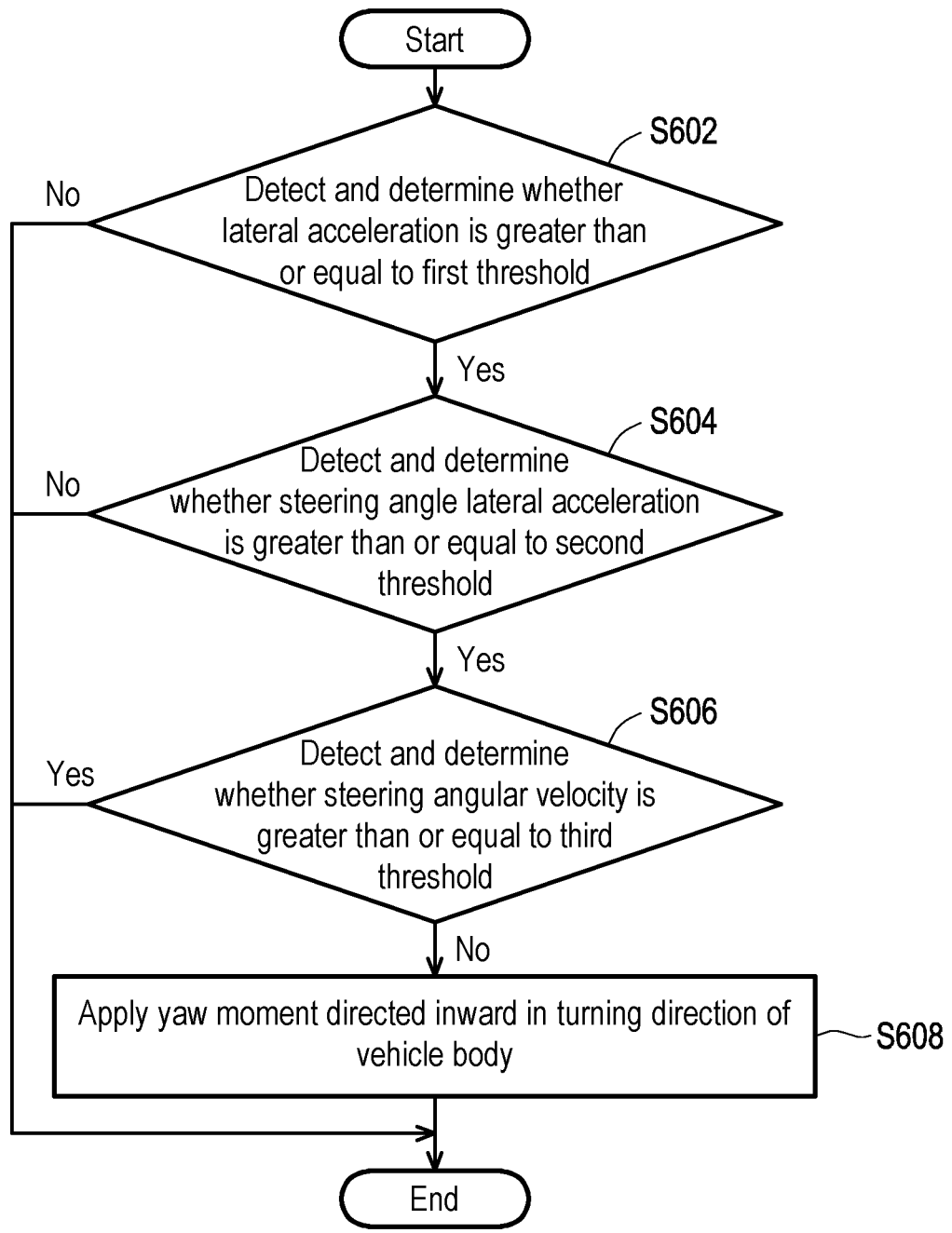
FIG. 6 is a flowchart of a vehicle behavior control method according to one embodiment of the disclosure.

FIG. 6 is a flowchart of a vehicle behavior control method according to one embodiment of the disclosure. Referring to FIG. 3 and FIG. 6, the vehicle behavior control method of the present embodiment is suitable for the vehicle behavior control device 100 of FIG. 3. The following describes detailed steps of the vehicle behavior control method of the present embodiment with reference to each unit in the vehicle behavior control device 100.

In step S602, in the vehicle behavior control device 100, the lateral acceleration sensor 110 detects the lateral acceleration occurring in the vehicle body, and the control device 160 determines whether the lateral acceleration is greater than or equal to a first threshold. If the control device 160 determines that the lateral acceleration is greater than or equal to the first threshold, the process proceeds to step S604 to perform determination of the next step. If the control device 160 determines that the lateral acceleration is less than the first threshold, the process ends.

In step S604, in the vehicle behavior control device 100, the wheel speed sensor 120 detects the wheel speed of the wheel, and the steering angle sensor 130 detects the steering angle of the wheel. Accordingly, the steering angle lateral acceleration calculation unit 162 of the control device 160 calculates the steering angle lateral acceleration according to the wheel speed and the steering angle, and the control device 160 determines whether the steering angle lateral acceleration is greater than or equal to a second threshold. If the control device 160 determines that the steering angle lateral acceleration is less than the second threshold, the process ends.

Since step S602 and step S604 are the same as or similar to step S402 and step S404 of the previous embodiment, details thereof will not be repeated.

A difference from the previous embodiment lies in that, in the present embodiment, when it is detected in step S604 that the steering angle lateral acceleration is greater than or equal to the second threshold, the process proceeds to step S606 in which the steering angular velocity detection unit 164 detects the steering angular velocity of the vehicle and the control device 160 determines whether the steering angular velocity is greater than or equal to a third threshold.

If the control device 160 determines that the steering angular velocity is greater than or equal to the third threshold, the process ends. If the control device 160 determines that the steering angular velocity is less than the third threshold, in step S608, the yaw moment control unit 168 applies the yaw moment directed inward in the turning direction of the vehicle body.

In some embodiments, a threshold of the steering angular velocity may vary with the vehicle speed. For example, the threshold may be approximately 250 degrees/second (deg/s) when the vehicle speed is 60 kilometers/hour (km/h), the threshold may be approximately 175 deg/s when the vehicle speed is 80 km/h, and the threshold may be approximately 135 deg/s when the vehicle speed is 100 km/h. However, the present embodiment does not limit the numerical value of the threshold and how the threshold is set.

When the vehicle behavior control intervenes during emergency avoidance or turning driving, the vehicle behavior may be delayed relative to the driver's operation, which may cause discomfort to the driver. In this regard, in the present embodiment, if the steering angular velocity is greater than or equal to a threshold, it is determined that the driver does not desire to perform intervention by vehicle behavior control (during emergency avoidance), and thus no vehicle behavior control is executed. Accordingly, no discomfort is experienced by the driver.

Figure 7A:
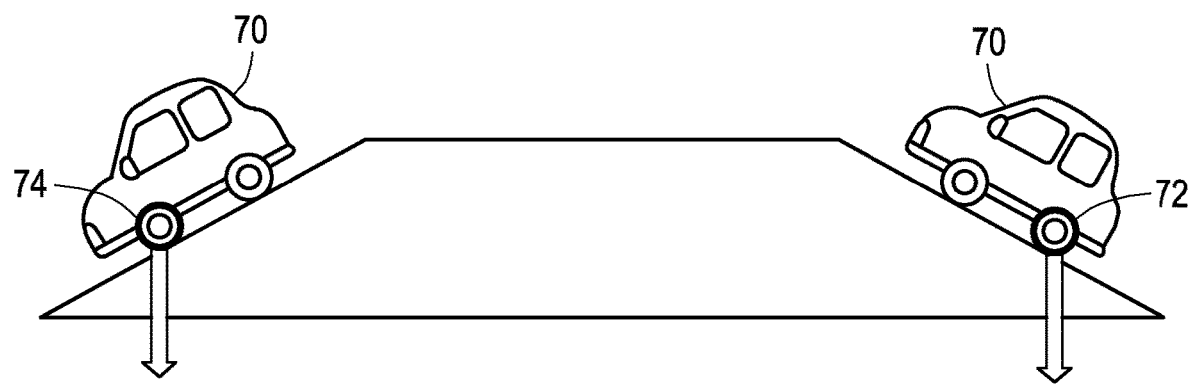
FIG. 7A is a schematic diagram of a vehicle behavior control method according to one embodiment of the disclosure.
Figure 7B:
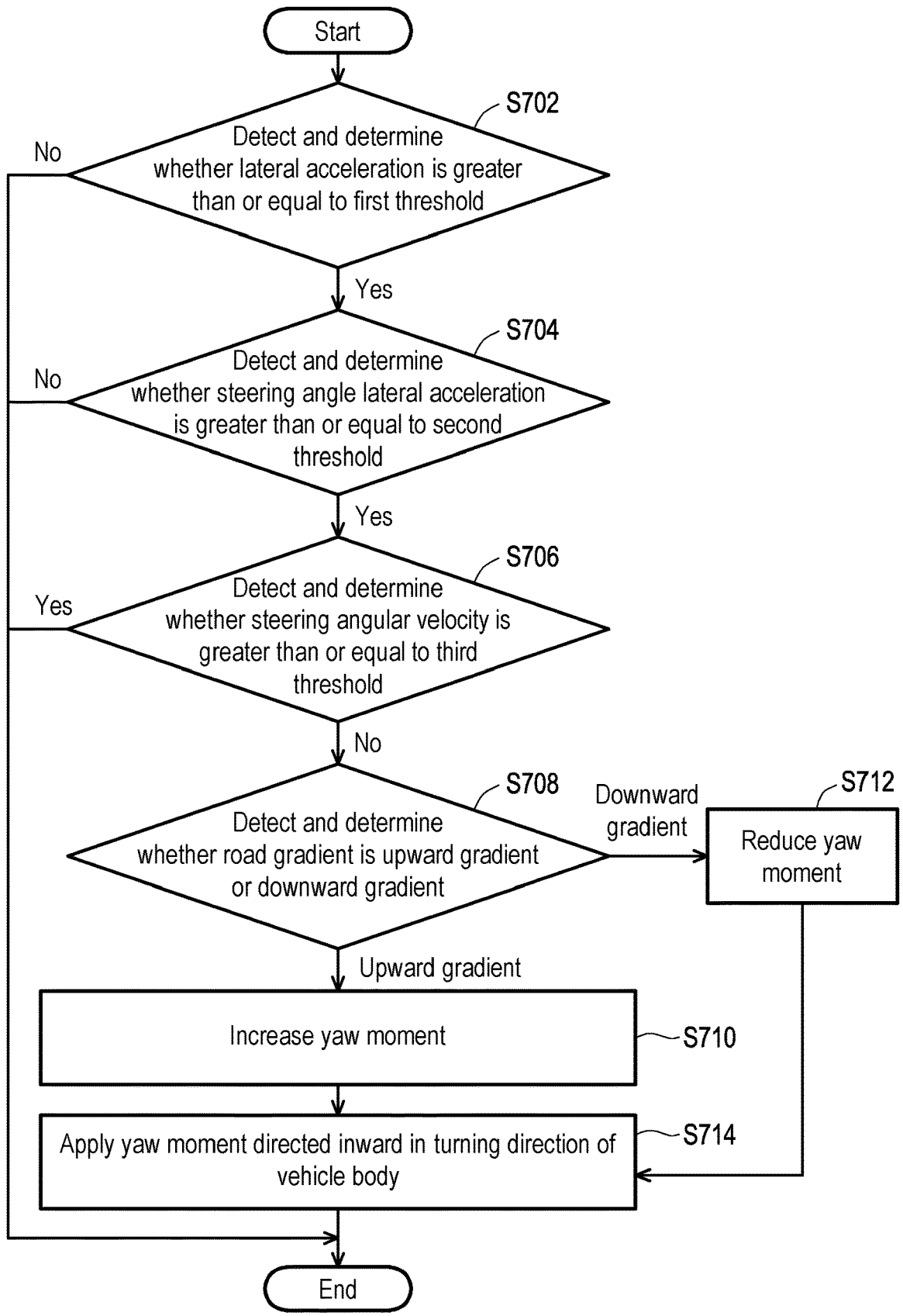
FIG. 7B is a flowchart of a vehicle behavior control method according to one embodiment of the disclosure.

FIG. 7A is a schematic diagram of a vehicle behavior control method according to one embodiment of the disclosure. FIG. 7B is a flowchart of a vehicle behavior control method according to one embodiment of the disclosure.

Referring first to FIG. 7A, in the present embodiment, when a vehicle 70 travels uphill, by increasing the applied yaw moment based on load applied to a rear wheel 72, cornering performance of the vehicle 70 can be improved. On the other hand, when the vehicle 70 travels downhill, by reducing the applied yaw moment based on load applied to a front wheel 74, the cornering performance of the vehicle 70 can be improved.

In detail, referring to FIG. 3 and FIG. 7B, the vehicle behavior control method of FIG. 7B is suitable for the vehicle behavior control device 100 of FIG. 3. The following describes detailed steps of the vehicle behavior control method of the present embodiment with reference to each unit in the vehicle behavior control device 100.

In step S702, in the vehicle behavior control device 100, the lateral acceleration sensor 110 detects the lateral acceleration occurring in the vehicle body, and the control device 160 determines whether the lateral acceleration is greater than or equal to a first threshold. If the control device 160 determines that the lateral acceleration is greater than or equal to the first threshold, the process proceeds to step S704 to perform determination of the next step. If the control device 160 determines that the lateral acceleration is less than the first threshold, the process ends.

In step S704, in the vehicle behavior control device 100, the wheel speed sensor 120 detects the wheel speed of the wheel, and the steering angle sensor 130 detects the steering angle of the wheel. Accordingly, the steering angle lateral acceleration calculation unit 162 of the control device 160 calculates the steering angle lateral acceleration according to the wheel speed and the steering angle, and the control device 160 determines whether the steering angle lateral acceleration is greater than or equal to a second threshold. If the control device 160 determines that the steering angle lateral acceleration is greater than or equal to the second threshold, the process proceeds to step S706 to perform determination of the next step. If the control device 160 determines that the steering angle lateral acceleration is less than the second threshold, the process ends.

In step S706, the steering angular velocity detection unit 164 detects the steering angular velocity of the vehicle, and the control device 160 determines whether the steering angular velocity is greater than or equal to a third threshold. If the control device 160 determines that the steering angular velocity is greater than or equal to the third threshold, the process ends.

Since step S702 to step S706 are the same as or similar to step S602 to step S606 of the previous embodiment, details thereof will not be repeated.

A difference from the previous embodiment lies in that, in step S706 of the present embodiment, if the control device 160 determines that the steering angular velocity is less than the third threshold, in step S708, the tilt sensor 140 detects a road gradient, and the control device 160 determines whether the road gradient detected by the tilt sensor 140 is an upward gradient or a downward gradient.

If it is determined that it is an upward gradient, in step S710, the yaw moment control unit 168 increases the yaw moment to be applied, and in step S714, the yaw moment control unit 168 applies the yaw moment directed inward in the turning direction of the vehicle body. In some embodiments, the yaw moment control unit 168 may increase the applied yaw moment as the upward gradient increases.

If it is determined that it is a downward gradient, in step S712, the yaw moment control unit 168 reduces the yaw moment to be applied, and in step S714, the yaw moment control unit 168 applies the yaw moment directed inward in the turning direction of the vehicle body. In some embodiments, the yaw moment control unit 168 may reduce the applied yaw moment as the downward gradient increases.

According to the above method, when the tilt sensor detects a value (upward gradient) above a threshold, load (vehicle weight) may be applied to a rear wheel, and a front wheel may not be effectively used. Accordingly, by increasing the applied yaw moment, the cornering performance can be improved. When the tilt sensor detects a value (downward gradient) below the threshold, load may be applied to the front wheel, and the ground load of a tire may be increased. Accordingly, by reducing the applied yaw moment, cornering can be facilitated.

Figure 8A:
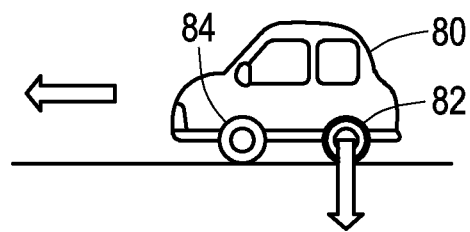
FIG. 8A and FIG. 8B are schematic diagrams of a vehicle behavior control method according to one embodiment of the disclosure.
Figure 8B:
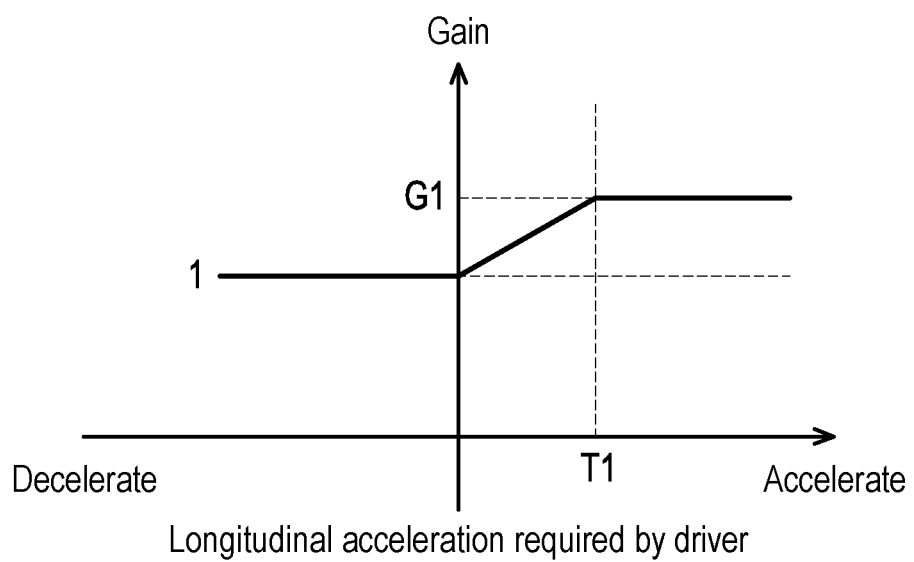
Figure 8C:
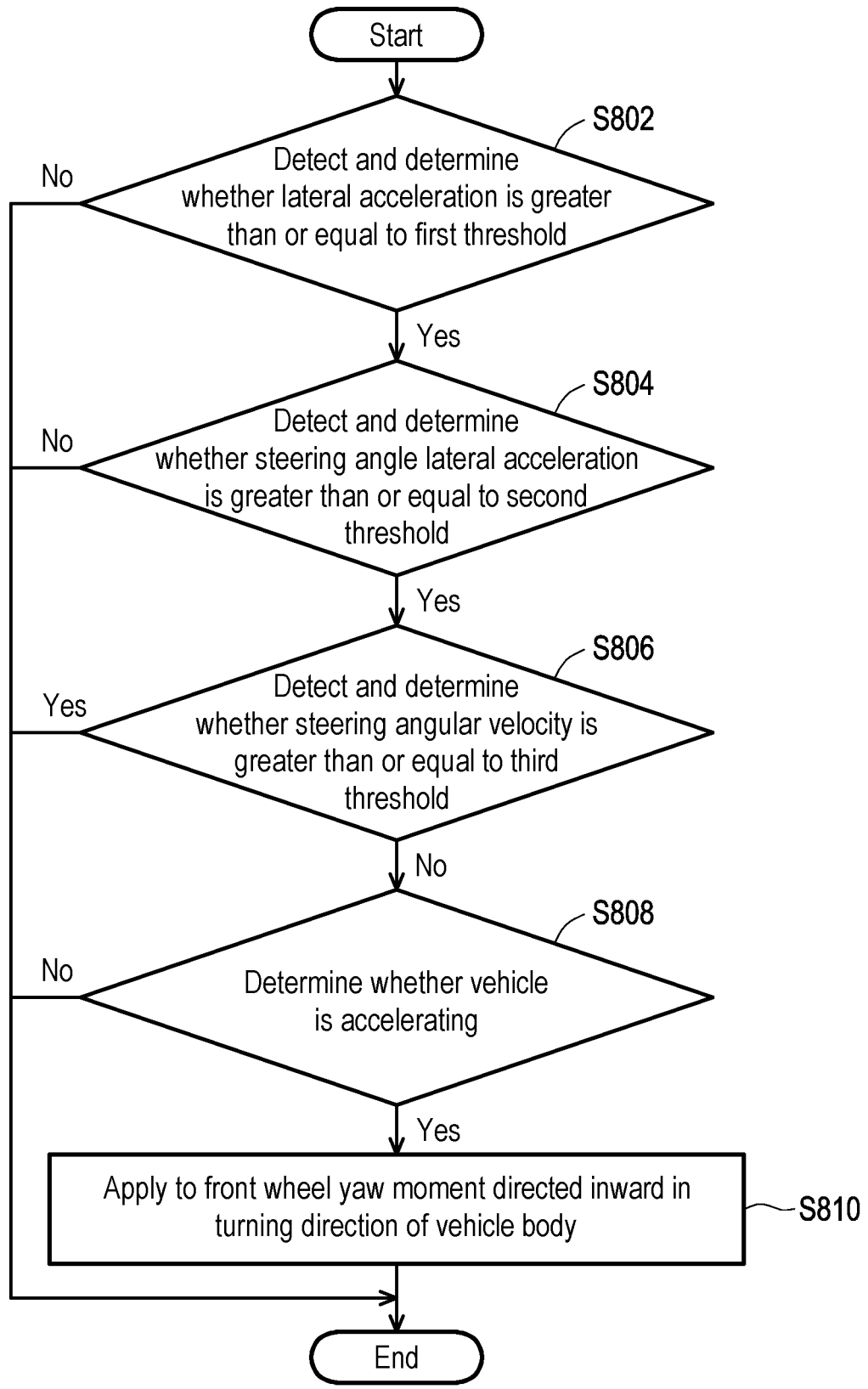
FIG. 8C is a flowchart of a vehicle behavior control method according to one embodiment of the disclosure.

FIG. 8A and FIG. 8B are schematic diagrams of a vehicle behavior control method according to one embodiment of the disclosure. FIG. 8C is a flowchart of a vehicle behavior control method according to one embodiment of the disclosure.

Referring first to FIG. 8A, in the present embodiment, when a vehicle 80 accelerates (accelerates to the left), by applying the yaw moment to a front wheel 84 based on load applied to a rear wheel 82, cornering performance of the vehicle 80 can be improved.

In some embodiments, an acceleration state of the vehicle 80 may be determined from an estimated value (that is, longitudinal acceleration required by the driver) calculated according to an accelerator pedal and a brake pedal, and the yaw moment may be adjusted according to a correction gain map 800 of the longitudinal acceleration required by the driver as illustrated in FIG. 8B. For example, when the longitudinal acceleration required by the driver exceeds a predetermined threshold T1, the yaw moment may be adjusted according to gain G1 corresponding to the longitudinal acceleration in the correction gain map 800.

In detail, referring to FIG. 3 and FIG. 8C, the vehicle behavior control method of FIG. 8C is suitable for the vehicle behavior control device 100 of FIG. 3. The following describes detailed steps of the vehicle behavior control method of the present embodiment with reference to each unit in the vehicle behavior control device 100.

In step S802, in the vehicle behavior control device 100, the lateral acceleration sensor 110 detects the lateral acceleration occurring in the vehicle body, and the control device 160 determines whether the lateral acceleration is greater than or equal to a first threshold. If the control device 160 determines that the lateral acceleration is greater than or equal to the first threshold, the process proceeds to step S804 to perform determination of the next step. If the control device 160 determines that the lateral acceleration is less than the first threshold, the process ends.

In step S804, in the vehicle behavior control device 100, the wheel speed sensor 120 detects the wheel speed of the wheel, and the steering angle sensor 130 detects the steering angle of the wheel. Accordingly, the steering angle lateral acceleration calculation unit 162 of the control device 160 calculates the steering angle lateral acceleration according to the wheel speed and the steering angle, and the control device 160 determines whether the steering angle lateral acceleration is greater than or equal to a second threshold. If the control device 160 determines that the steering angle lateral acceleration is greater than or equal to the second threshold, the process proceeds to step S806 to perform determination of the next step. If the control device 160 determines that the steering angle lateral acceleration is less than the second threshold, the process ends.

In step S806, the steering angular velocity detection unit 164 detects the steering angular velocity of the vehicle, and the control device 160 determines whether the steering angular velocity is greater than or equal to a third threshold. If the control device 160 determines that the steering angular velocity is greater than or equal to the third threshold, the process ends.

Since step S802 to step S806 are the same as or similar to step S602 to step S606 of the previous embodiment, details thereof will not be repeated.

A difference from the previous embodiment lies in that, in step S806, if the control device 160 determines that the steering angular velocity is less than the third threshold, in step S808, the acceleration state determination unit 166 calculates the acceleration of the vehicle, and determines the acceleration state of the vehicle based on the calculated acceleration. In some embodiments, the acceleration state may be determined by the vehicle speed detected by the vehicle speed sensor 150. In other embodiments, the acceleration state may be determined by an estimated value (longitudinal acceleration required by the driver) calculated according to the accelerator pedal and the brake pedal.

However, the present embodiment does not limit how the acceleration state is determined.

If the acceleration state determination unit 166 determines that the vehicle is accelerating, in step S810, the yaw moment control unit 168 applies the yaw moment directed inward in the turning direction of the vehicle body to the front wheel of the vehicle. On the other hand, if the acceleration state determination unit 166 determines that the vehicle is not accelerating, the process ends.

According to the above method, during acceleration of the vehicle, a force opposite to a traveling direction of the vehicle acts on the vehicle body. The load acts on a rear wheel, and the load on a front wheel is relatively reduced. Accordingly, the acceleration state of the vehicle body can be determined based on vehicle speed information. By increasing the applied yaw moment only during acceleration, a change in cornering properties caused by loss of the load on the front wheel can be reduced, and the cornering performance of the vehicle can be improved.

To sum up, in the vehicle behavior control device of the disclosure, when the lateral acceleration, the steering angle lateral acceleration, the steering angular velocity and/or the acceleration state of the vehicle meet the predetermined condition, the yaw moment directed inward in the turning direction of the vehicle body is applied to the vehicle body, and the magnitude of the applied yaw moment can be adjusted according to the gradient of the road surface on which the vehicle is traveling. Thus, the cornering performance of the vehicle can be improved and the limits of the cornering performance of the vehicle can be improved, thereby contributing to the development of a sustainable conveying system.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle behavior control method, suitable for a vehicle behavior control device comprising a lateral acceleration sensor that detects lateral acceleration occurring in a vehicle body, a wheel speed sensor that detects a wheel speed of a wheel, a steering angle sensor that detects a steering angle of the wheel, a steering angle lateral acceleration calculation unit that calculates steering angle lateral acceleration from the wheel speed and the steering angle, and a yaw moment control unit that applies a yaw moment to the vehicle body, wherein the vehicle behavior control method comprises:
   in response to the lateral acceleration and the steering angle lateral acceleration meeting a predetermined condition, applying a yaw moment directed inward in a turning direction of the vehicle body by the yaw moment control unit, wherein the vehicle behavior control device further comprises a steering angular velocity detection unit that detects a steering angular velocity, and the vehicle behavior control method further comprises:
   in response to the steering angular velocity being greater than or equal to a third threshold, not executing a procedure for applying the yaw moment.

2. The vehicle behavior control method according to claim 1, further comprising:
   in response to the lateral acceleration being greater than or equal to a first threshold, executing a procedure for applying the yaw moment.

3. The vehicle behavior control method according to claim 2, further comprising:
   in response to the lateral acceleration being less than the first threshold, not executing the procedure for applying the yaw moment.

4. The vehicle behavior control method according to claim 1, further comprising:
   in response to the steering angle lateral acceleration being greater than or equal to a second threshold, executing a procedure for applying the yaw moment.

5. The vehicle behavior control method according to claim 4, further comprising:
   in response to the steering angle lateral acceleration being less than the second threshold, not executing the procedure for applying the yaw moment.

6. A vehicle behavior control method, suitable for a vehicle behavior control device comprising a lateral acceleration sensor that detects lateral acceleration occurring in a vehicle body, a wheel speed sensor that detects a wheel speed of a wheel, a steering angle sensor that detects a steering angle of the wheel, a steering angle lateral acceleration calculation unit that calculates steering angle lateral acceleration from the wheel speed and the steering angle, and a yaw moment control unit that applies a yaw moment to the vehicle body, wherein the vehicle behavior control method comprises:
   in response to the lateral acceleration and the steering angle lateral acceleration meeting a predetermined condition, applying a yaw moment directed inward in a turning direction of the vehicle body by the yaw moment control unit, wherein the vehicle behavior control device further comprises a tilt sensor that detects a road gradient, and the vehicle behavior control method further comprises:
   in response to the tilt sensor detecting an upward gradient, increasing the applied yaw moment by the yaw moment control unit.

7. The vehicle behavior control method according to claim 6, further comprising:
   in response to an increase in the upward gradient, increasing the applied yaw moment by the yaw moment control unit.

8. The vehicle behavior control method according to claim 6, further comprising:
   in response to the tilt sensor detecting a downward gradient, reducing the applied yaw moment by the yaw moment control unit.

9. The vehicle behavior control method according to claim 8, further comprising:
   in response to an increase in the downward gradient, reducing the applied yaw moment by the yaw moment control unit.

10. A vehicle behavior control method, suitable for a vehicle behavior control device comprising a lateral acceleration sensor that detects lateral acceleration occurring in a vehicle body, a wheel speed sensor that detects a wheel speed of a wheel, a steering angle sensor that detects a steering angle of the wheel, a steering angle lateral acceleration calculation unit that calculates steering angle lateral acceleration from the wheel speed and the steering angle, and a yaw moment control unit that applies a yaw moment to the vehicle body, wherein the vehicle behavior control method comprises:

in response to the lateral acceleration and the steering angle lateral acceleration meeting a predetermined condition, applying a yaw moment directed inward in a turning direction of the vehicle body by the yaw moment control unit, wherein the vehicle behavior control device further comprises a vehicle speed sensor that detects a vehicle speed and an acceleration state determination unit that determines an acceleration state of a vehicle based on the vehicle speed, and the vehicle behavior control method further comprises:

in response to the acceleration state determination unit determining that the vehicle is accelerating, increasing the applied yaw moment by the yaw moment control unit.

* * * * *